J. STUBER & H. G. KUCK.
HOSE CONNECTOR.
APPLICATION FILED JULY 29, 1911.
1,101,818.
Patented June 30, 1914.
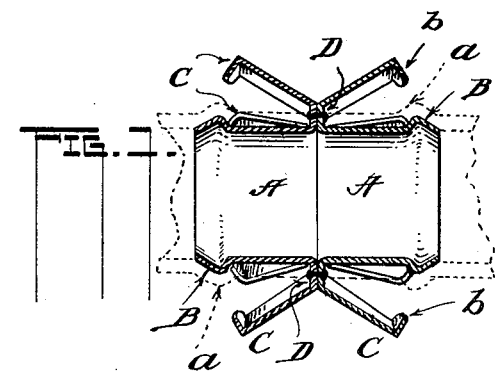
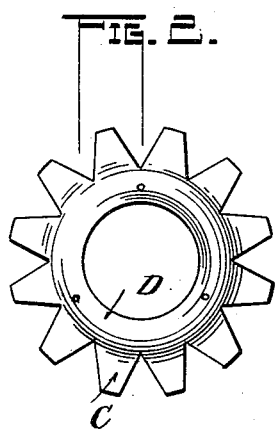
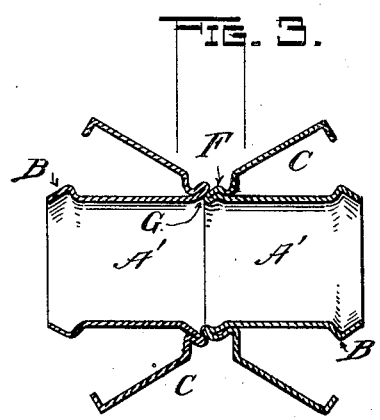
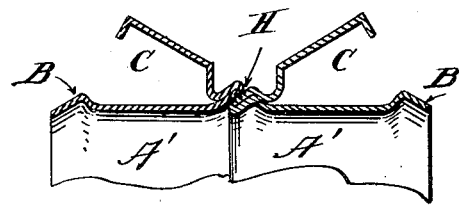
Witnesses:
Mabel C. Bradley
Eunice Beckum
Inventors:
Joseph Stuber,
Henry G. Kuck,
By L. M. Thurlow
Atty

UNITED STATES PATENT OFFICE.

JOSEPH STUBER AND HENRY G. KUCK, OF PEORIA, ILLINOIS.

HOSE-CONNECTOR.

1,101,818.   Specification of Letters Patent.   Patented June 30, 1914.

Application filed July 29, 1911. Serial No. 641,378.

*To all whom it may concern:*

Be it known that we, JOSEPH STUBER and HENRY G. KUCK, citizens of the United States, residing at Peoria, in the county of Peoria and State of Illinois, have invented certain new and useful Improvements in Hose-Connectors; and we do hereby declare that the following is a full, clear, and exact description of the invention, which will enable others skilled in the art to which it appertains to make and use the same.

This invention relates to a hose connector, or hose mender. It pertains to a mender for permanently joining hose-ends or the ends of a broken hose, and also to a part for permanently attaching a male or a female part or fitting to a hose-section by which to attach said hose to another hose section having a proper fitting to receive it, or for attaching it to a faucet, hydrant or other fixture.

One of the objects of the invention is to produce an exceedingly simple form of mender for joining the ends of a broken hose, said mender consisting of but two permanently connected parts to constitute the complete device.

Another object is to produce a hose mender of but two connected parts each part being made of sheet metal and formed by drawing, stamping or spinning the same.

Another object is to produce a hose mender which can be made up from two members one of such members being a counterpart of the other and made from the same die or form.

Another object is to construct a hose mender of but two parts adapted to be connected merely by the simple and instant process of electric welding or by otherwise connecting said parts, making an article complete in itself.

Other objects and advantages will appear herein.

In the accompanying drawing, Figure 1 is a longitudinal section of one of the forms of mender for joining the ends of a broken hose. Fig. 2 is an end elevation of one of the portions of the same. Fig. 3 is a slightly different structure of a complete mender. Fig. 4 shows part of the same slightly larger in size, the parts being connected by screw-threads.

It has been stated in the objects that one of the purposes of the invention is to produce a mender of sheet metal made by means of dies or forms and this, when made in the peculiar manner now to be described, admits of making a single part two of which go to make up the complete mender for joining the ends of a broken hose.

Sheet metal menders for hose have been made in the past but they have consisted of a number of parts. To be more specific they have consisted of more than two parts.

It is the aim, in order to reduce the cost of manufacture of a hose mender, to construct it of sheet metal. And in order to keep the cost down as low as possible, and to eliminate as many chances for leakage as possible, it is the further aim to employ the very least number of parts. In the present case there are but two identical parts preferably connected back to back by the simple and positive process of electric welding so that, practically, the mender is but a single part, the place of joining being absolutely tight with no possibility of a leak—the parts being fused together. Having made the lines clear between the older forms of mender and that of the present mender we will proceed to the description of the latter.

A A in Fig. 1 indicate the two portions making up one form of the mender, it being noted that each of these portions consists of a tubular body of the desired gage of metal having at its hose-receiving end an enlargement on head B. At its other end it has a series of fingers C preferably adjoining at their bases, as shown for instance in Fig. 2 and also overhanging the tubular body substantially as shown in Fig. 1, for example, in position to be bent down upon the hose *a*, indicated in broken lines, said hose being forced over the head B, with its end preferably abutting against an annular wall D of the body, which preferably lies substantially perpendicular to the axis of said body.

The fingers extend from the outer portion of this said wall, as clearly shown, the measurement between the outer surface of the body A and the inner surface of the base or root of the fingers being substantially equal to the thickness of the hose so that when said fingers are bent down upon the latter that member will be firmly inclosed at its abutting portion as well as at its inner and outer surfaces at said end. Preferably the fingers are provided each with a spur $b$ at its free end to engage the hose just behind the head B and, together with the latter, very effectually prevents the withdrawal of the hose from the body.

We lay no claim to novelty in providing by themselves a tubular part having a head over which to stretch a hose, and a series of fingers to engage the hose, but the novelty consists in making these parts in a single piece, or unit, and wherein the parts including the fingers are recurved or brought back over the portion A leaving the wall D described, against which the end of the hose abuts, the said recurved part overlying the immediate end of the latter, as will be described presently, preventing leakage at that point as will be more fully explained.

In practice the members A are placed back to back and electrically welded, by preference, so as to present the complete and finished article shown in Fig. 1, the welding operation being the only work required after the parts are formed into shape. In addition, the two parts may be riveted, together with the welding process, or may be used singly although the welding method is preferable, as stated, since it is quicker and is found to answer every requirement in the matter of strength as well as being the cheapest method of connecting the parts, and, furthermore, an absolutely water tight joint is the result.

As shown in Fig. 2 the roots of the fingers C are at the outermost portion of the wall D so that the end of the hose will lie solidly against the closed wall thereby more perfectly preventing leakage around the same when the fingers have been forced down to position on said hose end. The fingers are of such a form that when bent down upon the hose their edges abut thereby producing a practically continuous band around the hose and reducing the chance of leakage to a minimum which structure, however, is not new in itself.

Figs. 3 and 4, which illustrate a connector similar to that in Fig. 1, show the same structure with regard to the integral flange D except that instead of bending each said flange D abruptly outward it is bent for instance as at F so that one of its faces lies at substantially an angle of 45 degrees to the axis of the bore of the body indicated at A' so that one of them may partially fit into the other indicated at G and then welded together. Again, the angled faces may perhaps be threaded as at H in Fig. 4 to thus again form a tight joint, any of these various methods being contemplated in our invention and a mender or mender part constructed in any of these ways or the equivalents thereof, can be produced at small cost as compared with other members by reason of the few manipulations of the parts necessary in manufacturing, and assembling; the placing together of the two parts for welding or sweating, for example, being the only handling necessary after leaving the dies or forms. Further than this, the chances for leakage are reduced to a minimum since there are fewer joints than in most other devices of this character and purpose, through which the water might find an inlet. An advantage, also, is that in constructing a single part of the peculiar form described but a single set of dies or forms is required, two of such single connected parts constituting the complete device.

One of the tubular bodies A, A' may be permanently secured to a receptacle or other member for the purpose of permanently securing a hose to said receptacle or other member and thus said body could constitute an article complete in itself and furnished to the trade for the use mentioned.

Slight changes may be made in the device as may fairly fall within the meaning and intent of the appended claims since the invention contemplates any such changes as already stated.

Having described our invention, we claim:

1. A hose connector comprising two parts each formed up from one piece of sheet metal to provide a tubular portion, an outwardly extending portion at one end of the tubular portion, and a series of fingers projecting from said outwardly extending portion over said tubular portion, the outwardly extending portions of the parts being secured together with said tubular portions in alinement to constitute a substantially continuous tube.

2. A hose connector comprising two parts each formed up from one piece of sheet metal to provide a tubular portion, a radially extending flange at one end of the tubular portion and a series of fingers projecting from said flange over said tubular portion, said radially extending flanges being welded together with said tubular portions in alinement to constitute a substantially continuous tube.

3. As a new article of manufacture, a part fashioned from a single piece of sheet metal into a tubular portion to receive a hose at one end, and having at its other end a radially extending flange adapted for attachment to a receptacle or other part, and a series of fingers radiating from said flange overhanging the said tubular portion.

4. As a new article of manufacture, a part drawn into a tubular form from a single piece of sheet metal having at one end a radial flange adapted for attachment to a receptacle or other part, and a series of radiating fingers extending from the flange and overhanging the said tubular portion.

In testimony whereof we affix our signatures, in presence of two witnesses.

JOSEPH STUBER.
HENRY G. KUCK.

Witnesses:
W. I. SLEMMONS,
EUNICE BECKUM.

Copies of this patent may be obtained for five cents each, by addressing the "Commissioner of Patents, Washington, D. C."